United States Patent
Tomaszewski

(10) Patent No.: US 6,519,002 B1
(45) Date of Patent: Feb. 11, 2003

(54) METHOD AND APPARATUS TO MINIMIZE FLICKER EFFECTS FROM A DISCHARGE LIGHT SOURCE DURING DIGITAL VIDEO CAPTURE

(75) Inventor: Edward P. Tomaszewski, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/144,370

(22) Filed: Aug. 31, 1998

(51) Int. Cl.[7] .......................... H04N 9/73; H04N 5/217; H04N 5/222
(52) U.S. Cl. ...................... 348/226.1; 348/241; 348/370
(58) Field of Search ........................... 348/226.1, 227.1, 348/228.1, 224.1, 225.1, 241, 366, 370, 910

(56) References Cited

U.S. PATENT DOCUMENTS

| | | | | |
|---|---|---|---|---|
| 4,670,787 A | * | 6/1987 | Levine | 348/910 |
| 5,239,368 A | * | 8/1993 | Suzuki et al. | 348/226.1 |
| 5,293,238 A | * | 3/1994 | Nakano et al. | 348/226.1 |
| 5,384,595 A | * | 1/1995 | Sakaguchi | 348/241 |
| 6,295,085 B1 | * | 9/2001 | Munson et al. | 348/226.1 |

* cited by examiner

*Primary Examiner*—Wendy R. Garber
*Assistant Examiner*—Luong Nguyen
(74) *Attorney, Agent, or Firm*—Blakely, Sokoloff, Taylor & Zafman LLP

(57) ABSTRACT

A method having the step of setting a programmable clock to a first frequency; capturing a first set of frames at the first frequency; and then determining a first standard deviation of a first set of average intensities for the first set of frames. In addition, the method also includes the steps of setting the programmable clock to a second frequency; capturing a second set of frames at the second frequency; and determining a second standard deviation of a second set of average intensities for the second set of frames. Then, comparing the first standard deviation with the second standard deviation; and, setting the programmable clock based on the comparison.

15 Claims, 4 Drawing Sheets

METHOD AND APPARATUS TO MINIMIZE FLICKER EFFECTS FROM A DISCHARGE LIGHT SOURCE DURING DIGITAL VIDEO CAPTURE

BACKGROUND

This invention relates to the field of use of digital video capture. More particularly, the present invention relates to method and apparatus to minimize flicker effects from a discharge light source during digital video capture.

DESCRIPTION OF BACKGROUND

Digital cameras are currently being used in many applications, including both still image and video acquisition. To acquire images, digital cameras utilize a sensor array made up of an arranged pattern of photodiodes (e.g., light sensitive diodes, or, photosensors). Each photodiode measures the amount of light it receives by storing a corresponding amount of charge on an integrated capacitor. The amount of charge stored by each photodiode is then converted into a digital value by an analog-to-digital converter such that all the digital values, after being converted and reassembled into a particular array, can be processed to arrive at a digital image.

Typically, the photosensor array is exposed to the scene to be captured through the use of either a mechanical or electronic shutter that allows either (1) light to fall upon the photosensor array, or (2) charge to accumulate on each photosensor in the array, respectively. The photosensor array can either capture the charge in a row-by-row fashion as in the latter case, or, alternatively, in the former case, the image can be captured as a whole (e.g., the photosensor array is exposed to a light source all at once). The processing of the charges which are stored on each of the photosensors is then performed either in a row-by-row fashion, or in a pixel-by-pixel fashion. Images captured in this row by row fashion is termed to be captured in a "pipelined" mode of operation. For video image capture applications, a series of frames, or images, are captured similar to the manner above.

As digital cameras are positioned to replace traditional film-based cameras, they must be capable of operating under a variety of lighting situations. For example, digital cameras must be able to capture videos of scenes which are illuminated by sunlight, if outdoors, or which are illuminated by incandescent or discharge lights, if indoors.

However, when capturing a sequence of frames under an environment lighted by a discharge lamp (e.g., a fluorescent light), the digital video will contain artifacts due to the fact that the discharge lamp can vary in intensity and color temperature as a function of time. Thus, discharge lamps such as fluorescent lights or tungsten lamps do not offer a constant intensity of light but instead offer an intensity which, if measured and plotted on a chart, resembles a full wave rectified sine wave.

FIG. 1 shows an example of the intensity of fluorescent lighting as it varies over time, where the Y-axis represents the intensity of the light sensed by the photodiode, and the X-axis represents the passage of time. As can be seen by FIG. 1, the intensity of the light generated by fluorescent lighting (and thus sensed by the photodiode) is periodic and resembles the squared value of a sine wave. As the variation of the intensity is a function of time, a video stream that is captured in this lighting will include a potentially considerable amount of variation in the quality of the captured video as the capture is also a function of time.

The problem is also compounded in the fact that the variation in the intensity of discharge lamp lighting is different in different parts of the world as some countries use a 60 Hz alternating current (AC) power system and other countries use a 50 Hz AC power system. For example, the United States uses an AC power system which oscillates at 60 Hz. Thus, depending on the country in which the digital camera is used, the frame capture rate will have to be adjusted such that the frame capture rate is a function of the operating cycle of the power supply.

One approach that allows a digital camera to function under discharge lamp lighting of different power systems is to have the user enter a code designating the country in which the digital camera will be used. The camera would then adjust the frame capture rate according to the operating frequency of the country. The camera would maintain a list of correspondences between the regions in which it is currently operating and also what power system is functional in that region. Also, this approach will require the user to input a code every time a user entered a region with a different power system. Thus, this approach would require that the user manually enter the user's current location.

A second approach would be to incorporate a system into the camera itself, such as a global positioning system (GPS), which would allow the camera to be "self-aware" as to which geographic location it is in and thus automatically sets the camera's internal systems accordingly. However, this approach would require additional circuitry which would place additional power and cost requirements into the digital camera.

Yet another approach would be to include circuitry to have the camera automatically recognize the power system in which it is currently operating by having the user plug the camera into the power system of the country. For example, when a user reaches a certain location or a new region, the user would simply plug the camera into a wall outlet to allow the circuitry of a digital camera to register the operating cycle of the power system. However, this approach is also not recommended as different regions around the world usually have different configurations of wall sockets and connectors on those sockets such that the user would have to carry along a set of adapters, which could number into the tens or hundreds, to be sure that the user can plug the digital camera into the power system.

It would be preferable to have a system that minimizes the effects of using discharge lamp lighting that does not require user intervention or increased cost and power requirements on the camera itself.

SUMMARY

What is disclosed is a method having the step of setting a programmable clock to a first frequency; capturing a first set of frames at the first frequency; and then determining a first standard deviation of a first set of average intensities for the first set of frames. In addition, the method also includes the steps of setting the programmable clock to a second frequency; capturing a second set of frames at the second frequency; and determining a second standard deviation of a second set of average intensities for the second set of frames. Then, comparing the first standard deviation with the second standard deviation; and, setting the programmable clock based on the comparison.

DETAILED DESCRIPTION

The present invention provides a method and apparatus for reducing the effects of flicker from discharge lamps in a captured video stream. For purposes of explanation, specific embodiments are set forth to provide a thorough understanding of the present invention. However, it will be understood by one skilled in the art, from reading this disclosure, that the invention may be practiced without these details. Further, although the present invention is described through the use of a CMOS image sensor, most, if not all, aspects of the invention apply to image sensors in general. Moreover, well-known elements, devices, process steps and the like are not set forth in detail in order to avoid obscuring the present invention.

As the intensity and color value output from a discharge lamp varies in a sinusoidal, therefore periodic fashion, due to the applied AC voltage, the present invention utilizes the image sensor to sample the overall illumination to detect whether the system operating in a 50 Hz, 60 Hz or incandescent light situation. Then, integration is performed by the image sensor under different constraints based on the detected light frequency. The timing allows the photosensor array to capture each frame at approximately the same time in the cycle of the oscillation of the light intensity received from the discharge lamp.

Figure 1:
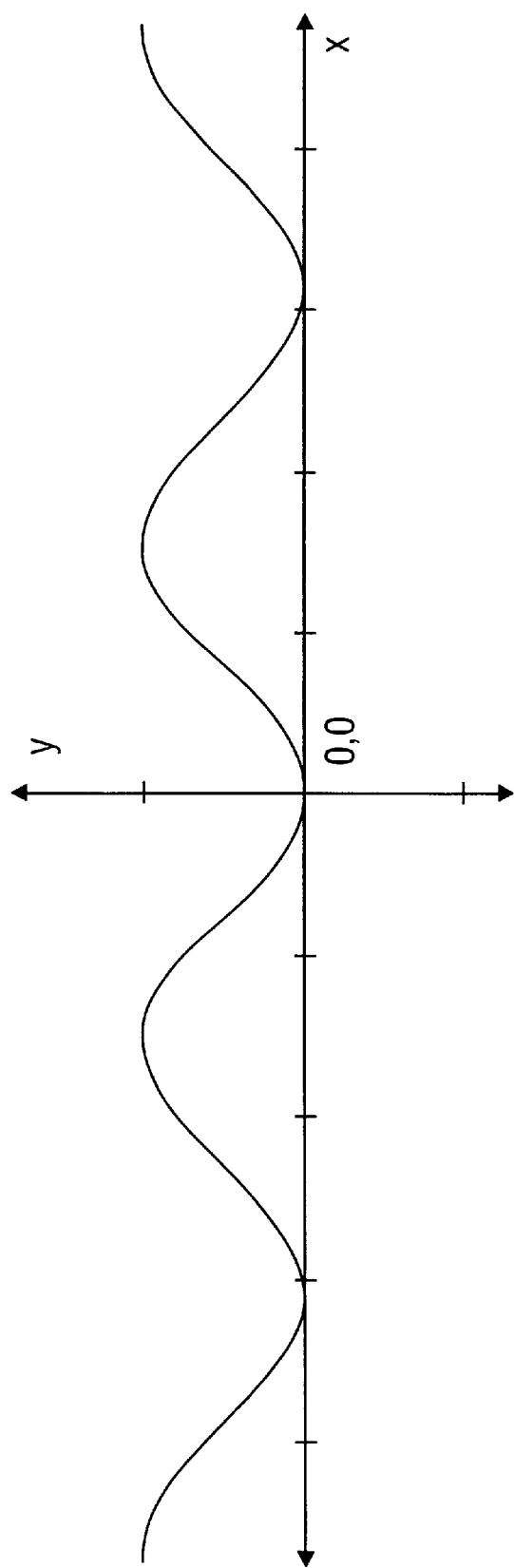
FIG. 1 is a plot of the light intensity from a discharge lamp measured over time.
Figure 2:
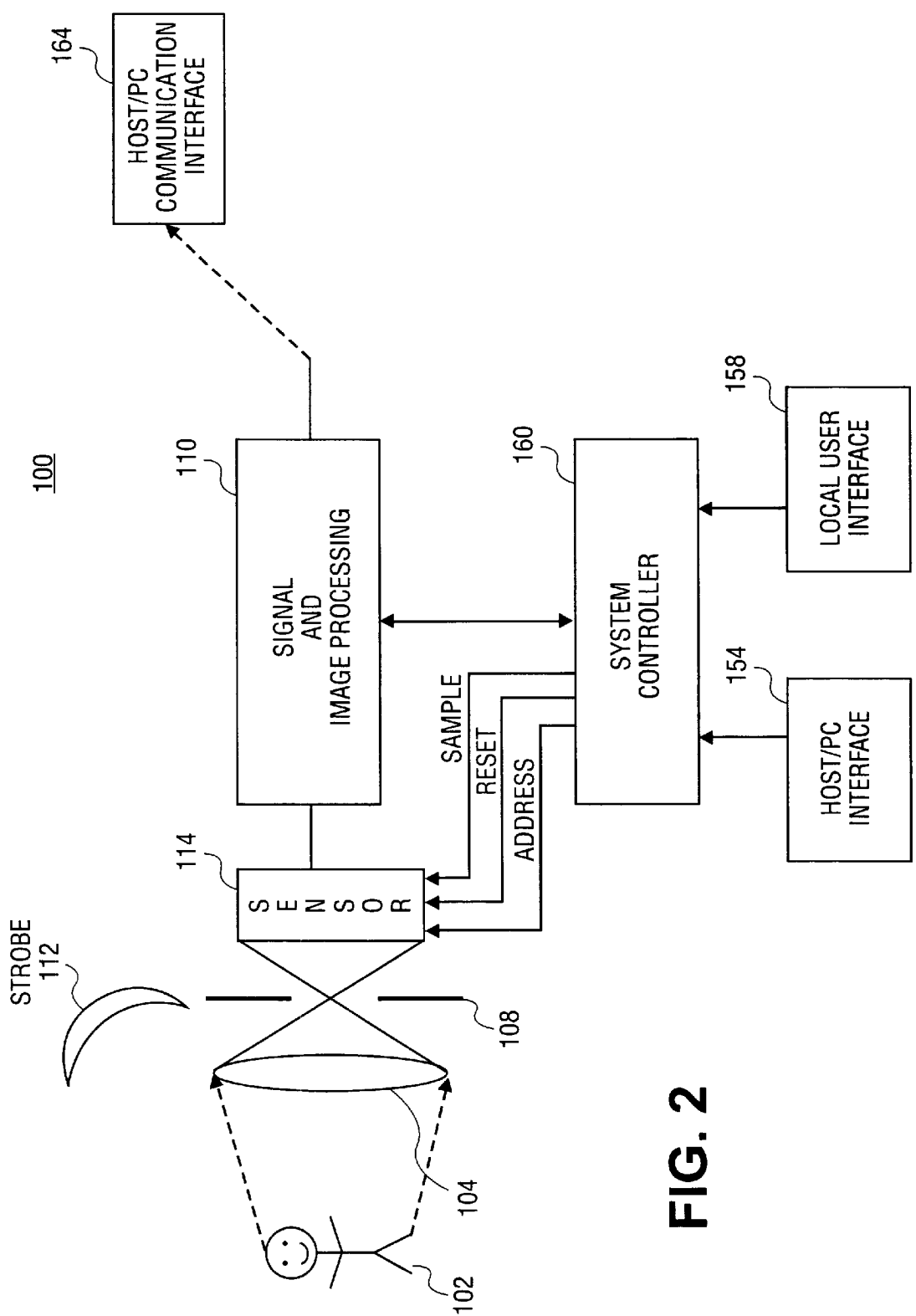
FIG. 2 is a block diagram of a digital image capture system configured in accordance with one embodiment of the present invention.

An embodiment of the invention as an imaging system 100 is shown as a logical block diagram in FIG. 2. Imaging system 100 includes a number of conventional elements, such as an optical system having a lens 104 and aperture 108 that is exposed to the incident light reflected from a scene or object 102. The optical system properly channels the incident light towards a sensor array 114 that generates sensor signals in response to an image of object 102 being formed on sensor array 114. The various control signals used in the operation of sensor array 114, such as the RESET signal, the SAMPLE signal, and the ADDRESS signal, is generated by a system controller 160. As described below, system controller 160 may include a microcontroller or a processor with input/output (I/O) interfaces that generates the control signals in response to instructions stored in a non-volatile programmable memory. System controller 160 also acts in response to user input via a local user interface 158 (as when a user pushes a button or turns a knob of system 100) and to a host/PC interface 154 to manage the operation of imaging system 100.

To obtain processed images, a signal and image processing block 110 is provided in which hardware and software operates according to image processing methodologies to generate captured image data with a predefined resolution in response to receiving the sensor signals. Optional storage devices (not shown) can be used aboard system 100 for storing the captured image data. Such local storage devices may include a removable memory card. A host/Personal Computer (PC) communication interface 164 is normally included for transferring the captured image data to an image processing and/or viewing system such as a computer separate from imaging system 100. Imaging system 100 can optionally contain a display means (not shown) for displaying the captured image data. For instance, imaging system 100 may be a portable digital camera having a liquid crystal display or other suitable low power display for showing the captured image data.

Figure 3:
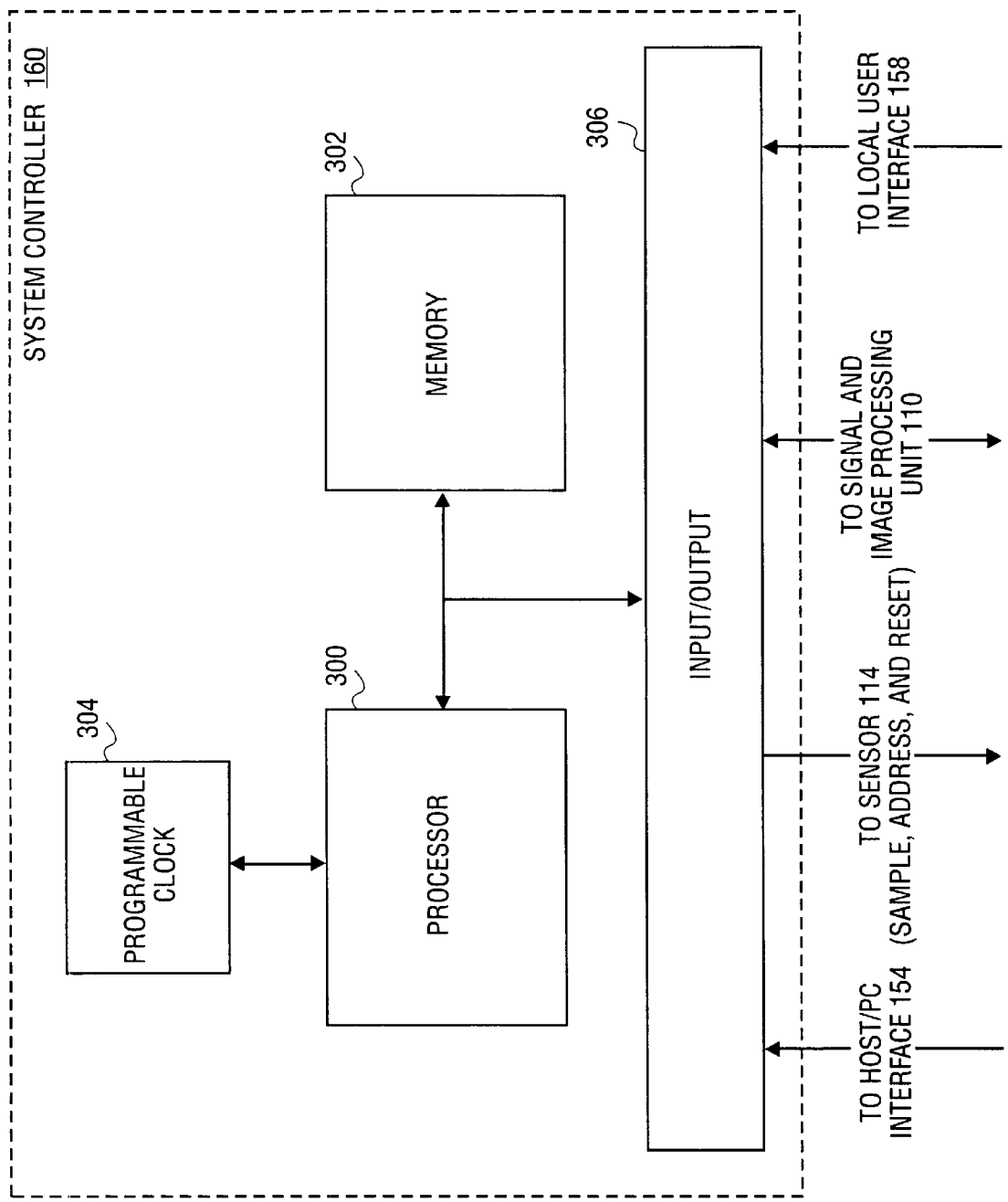
FIG. 3 is a block diagram of a system controller configured in accordance with one embodiment of the present invention contained in the digital image capture system of FIG. 2.

FIG. 3 is a block diagram of system controller 160 configured in accordance with one embodiment of the present invention. System controller 160 contains a processor 300, a memory 302, and an input/output (I/O) unit 306 communicating over a local bus. A programmable clock 304 is also coupled to processor 300. In one embodiment, processor 300 may be an application specific integrated circuit (ASIC). In another embodiment, processor 300 may be a general processor or a microcontroller such as those manufactured by Intel Corporation. Processor 300 is configured to operate in accordance with a program contained in memory 302.

Memory 302 may be a non-volatile memory such as a programmable flash memory, a volatile memory such as a dynamic random access memory, or a combination of non-volatile and volatile memory elements as may be needed to implement the present invention. In one embodiment, memory 302 contains a firmware program that controls all aspect of operation of processor 300.

I/O unit 306 is used to interface with and/or control sensor 114, host/PC interface 154, and local user interface 158. For example, I/O unit 306 supplies the SAMPLE, RESET, and ADDRESS signals to sensor 114.

Programmable clock 304 may be set by processor 300 to generate a pulse at the frequencies that is used in the present invention. In one embodiment, programmable clock 304 may be set to generate a pulse on either a 50 Hz cycle or a 60 Hz cycle. The pulses generated by programmable clock 304 is used by processor 300 to track when a frame capture needs to be initiated. For example, if programmable clock 304 is set to 60 Hz, then programmable clock 304 will generate a pulse every second. When processor 300 receives a pulse from programmable clock 304, processor 300 initiates a frame capture. It is to be noted that the timing functions provided by programmable clock 304 may be integrated into processor 300 as part of a function of a system clock of processor 300. Also, in other embodiments, programmable clock 304 may generate a pulse at a multiple of 60 Hz or a multiple of 50 Hz.

Figure 4:
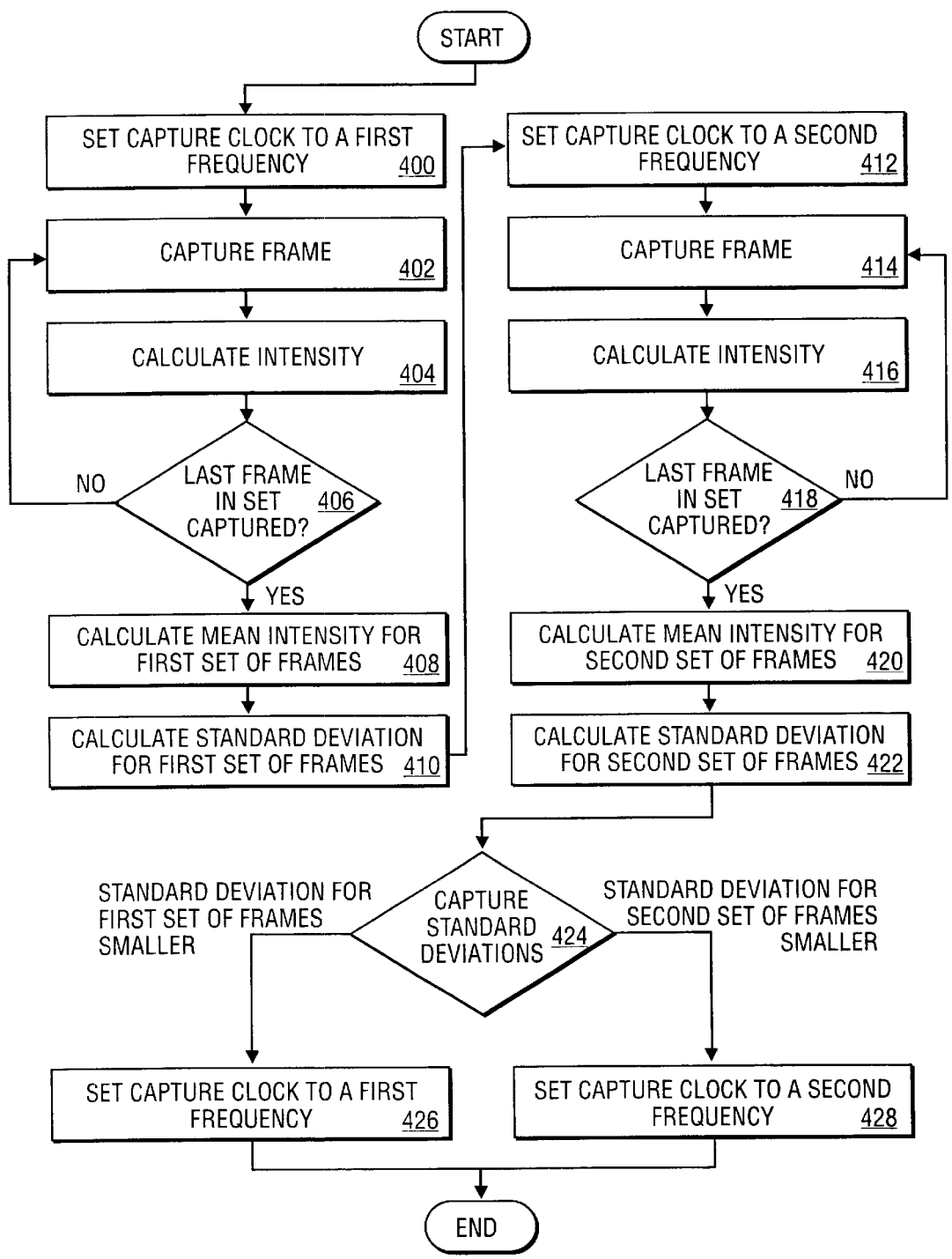
FIG. 4 is a flow diagram illustrating one mode of operation of the digital image capture system.

FIG. 4 is a flow diagram of the operation of imaging system 100 in accordance with the present invention to minimize the flicker effects from a fluorescent light source during digital video capture. In general, imaging system 100 captures a first set of frames at one frequency (e.g., 60 Hz) and then determines the mean and standard deviation for the average intensity of each frame in the first set of frames. Imaging system 100 then determines a mean and standard deviation for the average intensity of each frame in a second set of captured frames that is captured at a second frequency (e.g., 50 Hz). Thereafter, the standard deviations are compared, and capture frequency that generated the smaller standard deviation is used as the clock frequency for basing the timing for subsequent frame captures.

The operation of imaging system 100 described in FIG. 4, in one embodiment, is performed at the initial set-up of imaging system 100. The process described in FIG. 4 may also be performed at any other time. For example, the process may be performed after a predetermined time period or after a certain event has happened, such as when imaging system 100 detects a sudden change in detected light intensity in the scene, which might indicate that imaging system 100 has been moved to a new location with a different light source.

In block 400, processor 300 sets programmable clock 304 to a first frequency. In one embodiment, this first frequency is 60 Hz. In another embodiment, this first frequency is 50 Hz. The value chosen for the first frequency is not critical as both line frequencies need to be detected. Thus, which ever frequency is not chosen as the first frequency is set to be a second frequency, as discussed below.

In block 402, a frame is captured during the next frame capture cycle. The capture is controlled by processor 300 in system controller 160. In one embodiment, the frame that is captured does not need to include the full resolution of sensor 114. For example, even if sensor 114 is capable of capturing images with a horizontal resolution of 640 pixels and a vertical resolution of 480 (i.e., 640×480 resolution), the frame that is captured does not need to have a 640×480 resolution. Instead, a subset of the pixels of sensor 114, such as 320×240 resolution, may be captured. Operation then continues with block 404.

In block 404, an average intensity is determined for the captured frame. In one embodiment, the average intensity is determined by averaging the image values for all the pixels of the captured frame. In other embodiments, a separate luminance value may be calculated for each pixel and the luminance values of all these pixels then averaged to determine the average intensity. As discussed above, the frame might not be a full resolution capture of sensor 114 (e.g., the frame size may be 128 pixels high by 128 pixels wide). After the average intensity is determined for the captured frame, it is store for later use, as discussed below.

In block 406, it is determined whether there has been enough frames captured to arrive at an accurate statistical representation of the captured frequency. In one embodiment, sixteen frames are captured before operation continues with block 408. If enough frames has been captured, then operation continues with block 408. If more frames are to be captured, then operation returns to block 402.

In block 408, the mean intensity is determined for the set of average intensities determined from the iteration of block 402 to block 406. In one embodiment, the mean that is determined is an arithmetic mean, following the form of:

$$\overline{X} = \frac{\sum X_i}{n}$$

where n is the number of frames in the first set of captured frames and $X_i$ is the average intensity of frame i. Once the mean intensity is determined, operation then continues with block 410.

In block 410, the standard deviation of the set of average intensities is determined. The standard deviation is determined in accordance to the following form:

$$\sigma = \sqrt{\frac{X_i^2}{n} - (\overline{X})^2}$$

where n is the number of frames in the first set of captured frames and $X_i$ is the average intensity of frame i and $\overline{X}$ is the mean intensity determined in block 408.

In block 412, programmable clock 304 is set to a second frequency. As described in block 400, if 60 Hz is the first frequency to which programmable clock 304 is set, then 50 Hz is used as the second frequency. Conversely, if the first frequency to which programmable clock 304 is set is 50 Hz, then 60 Hz is used as the second frequency. After programmable clock 304 is set to this second frequency, operation continues with block 414.

In block 414, a frame is captured during the next frame capture cycle. The capture is controlled by processor 300 in system controller 160. As described above in block 402, the frame captured does not need to be at the full resolution of the sensor 114. In one embodiment, the resolution of the captured frame is the same resolution of the frame captured in block 402. Thus, once the resolution of the first frame captured in the first iteration of block 402 is determined, all subsequent frames that are capture during the iteration of block 402 and block 414 have the same resolution.

In block 416, an average intensity is determined for the captured frame. In one embodiment, the average intensity is determined by averaging the image values for all the pixels of the captured frame. As discussed above, the frame might not be a full resolution capture of sensor 114. After the average intensity is determined for the captured frame, it is store for later use, as discussed below.

In block 418, it is determined whether there has been enough frames captured to arrive at an accurate statistical representation of the captured frequency. In one embodiment, the same number of frames that are determined to be statistically accurate in block 406 may be assumed to be sufficient for block 418. Thus, the iteration of block 414 and block 416 are repeated the same number of times as the iterations of block 402 and block 404. If there are more frames to be captured (e.g., there has not been a sufficient number of frames captured at the second frequency), then operation returns to block 414.

In block 420, the mean intensity is determined for the set of average intensities determined from the iterations of block 414 to block 418. As discussed for block 408, an arithmetic mean may be used to calculate the mean intensity for the second set of captured frames.

In block 422, the standard deviation of the set of average intensities for the second set of captured frames is determined. The form used to calculate the standard deviation is as discussed for block 410.

In block 424, the standard deviation of the average intensities for the first set of captured frames (captured when programmable clock 304 is set to the first frequency), is compared to the standard deviation of the average intensities for the second set of captured frames (captured when programmable clock 304 is set to the second frequency). If the standard deviation of the average intensities for the first set of captured frames is smaller than the standard deviation of the average intensities for the second set of captured frames, then operation continues with block 426. Otherwise, operation continues with block 428. If the standard deviations are equal to each other, then, in one embodiment, operation continues with block 426.

In block 426, programmable clock 304 is set to the first frequency. In one embodiment, the first frequency is 60 Hz. In another embodiment, this first frequency is 50 Hz. Operation then ends.

In block 428, programmable clock 304 is set to the second frequency. In one embodiment, the second frequency is 50 Hz. In another embodiment, this second frequency is 60 Hz. Operation then ends.

For example, if the first frequency is 60 Hz, and the standard deviation of the average intensities for the frames in the first set of captured frames are smaller than the standard deviation of the average intensities for the frames in the second set of captured frames, then programmable clock 304 is set to 60 Hz. Thereafter, the timing of all subsequent frame captures are captured based on the 60 Hz rate.

It is to be noted that if the light source is from either an incandescent light or the sun, then it does not matter which frequency is used as the reference frequency for the timing of frame captures. This is due to the fact that there are no effects from the mismatches between the capture frequency and the frequency of light intensity of the light source as the light source does not oscillate in light intensity.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. An method comprising:

setting a programmable clock to a first frequency;

capturing a first set of frames at said first frequency;

determining a first standard deviation of a first set of average intensities for said first set of frames;

setting said programmable clock to a second frequency;

capturing a second set of frames at said second frequency;

determining a second standard deviation of a second set of average intensities for said second set of frames;

comparing said first standard deviation with said second standard deviation; and, setting said programmable clock based at least in part on said comparison.

2. The method of claim 1, where said step of determining said first standard deviation comprises the step of:

determining a first mean intensity of said first set of average intensities; and, determining a standard deviation by the equation:

$$\sigma = \sqrt{\frac{X_i^2}{n} - (\overline{X})^2}$$

where n is the number of frames in said first set of frames and $X_i$ is an average intensity of frame i and $\overline{X}$ is said first mean intensity.

3. The method of claim 2, wherein said step of determining said first mean intensity comprises the step of determining a mean by the equation:

$$\overline{X} = \frac{\sum X_i}{n}$$

where n is a number of frames in said first set of frames and $X_i$ is an average intensity of frame i.

4. The method of claim 1, where said step of determining said second standard deviation comprises the step of:

determining a second mean intensity of said second set of average intensities; and, determining a standard deviation by the equation:

$$\sigma = \sqrt{\frac{X_i^2}{n} - (\overline{X})^2}$$

where n is the number of frames in said second set of frames and $X_i$ is an average intensity of frame i and $\overline{X}$ is said second mean intensity.

5. The method of claim 4, wherein said step of determining said second mean intensity comprises the step of determining a mean by the equation:

$$\overline{X} = \frac{\sum X_i}{n}$$

where n is a number of frames in said second set of frames and $X_i$ is an average intensity of frame i.

6. The method of claim 1, where said step of setting said programmable clock based on said comparison comprises the steps of:

determining if said first standard deviation is smaller than said second standard deviation; and, if said first standard deviation is smaller than said second standard deviation, then setting said programmable clock to said first frequency.

7. The method of claim 1, where said step of setting said programmable clock based on said comparison comprises the steps of:

determining if said first standard deviation is larger than said second standard deviation; and, if said first standard deviation is larger than said second standard deviation, then said programmable clock is set to said second frequency.

8. An article comprising:

a computer readable medium having instructions stored thereon which when executed performs:

setting a programmable clock to a first frequency;

capturing a first set of frames at said first frequency;

determining a first standard deviation of a first set of average intensities for said first set of frames;

setting said programmable clock to a second frequency;

capturing a second set of frames at said second frequency;

determining a second standard deviation of a second set of average intensities for said second set of frames;

comparing said first standard deviation with said second standard deviation; and, setting said programmable clock based at least in part on said comparison.

9. The article of claim 8, wherein said determining said first standard deviation includes:

determining a first mean intensity of said first set of average intensities; and, determining a standard deviation by the equation:

$$\sigma = \sqrt{\frac{X_i^2}{n} - (\overline{X})^2}$$

where n is the number of frames in said first set of frames and $X_i$ is an average intensity of frame i and $\overline{X}$ is said first mean intensity.

10. The article of claim 9, wherein said determining said first mean intensity includes determining a mean by the equation:

$$\overline{X} = \frac{\sum X_i}{n}$$

where n is a number of frames in said first set of frames and $X_i$ is an average intensity of frame i.

11. The article of claim 8, wherein said determining said second standard deviation includes:
   determining a second mean intensity of said second set of average intensities; and,
   determining a standard deviation by the equation:

$$\sigma = \sqrt{\frac{X_i^2}{n} - (\overline{X})^2}$$

where n is the number of frames in said second set of frames and $X_i$ is an average intensity of frame i and $\overline{X}$ is said second mean intensity.

12. The article of claim 11, wherein said determining said second mean intensity includes determining a mean by the equation:

$$\overline{X} = \frac{\sum X_i}{n}$$

where n is a number of frames in said second set of frames and $X_i$ is an average intensity of frame i.

13. The article of claim 8, wherein said setting said programmable clock based on said comparison includes:
   determining if said first standard deviation is smaller than said second standard deviation; and,
   if said first standard deviation is smaller than said second standard deviation, then setting said programmable clock to said first frequency.

14. The article of claim 8, wherein said setting said programmable clock based on said comparison includes:
   determining if said first standard deviation is larger than said second standard deviation; and,
   if said first standard deviation is larger than said second standard deviation, then setting said programmable clock to said second frequency.

15. An imaging system comprising:

an image sensor;

a controller having a programmable clock coupled to said image sensor;

a computer readable medium coupled to said controller having instructions stored thereon which when executed, causes said controller to:

set said programmable clock to a first frequency;

capture a first set of frames at said first frequency;

determine a first standard deviation of a first set of average intensities for said first set of frames;

set said programmable clock to a second frequency;

capture a second set of frames at said second frequency;

determine a second standard deviation of a second set of average intensities for said second set of frames;

compare said first standard deviation with said second standard deviation; and, set said programmable clock based at least in part on said comparison.

\* \* \* \* \*